F. V. De COPPET.
Processes and Apparatus for Making Ice.
No. 8,919. Reissued Sept. 30, 1879.
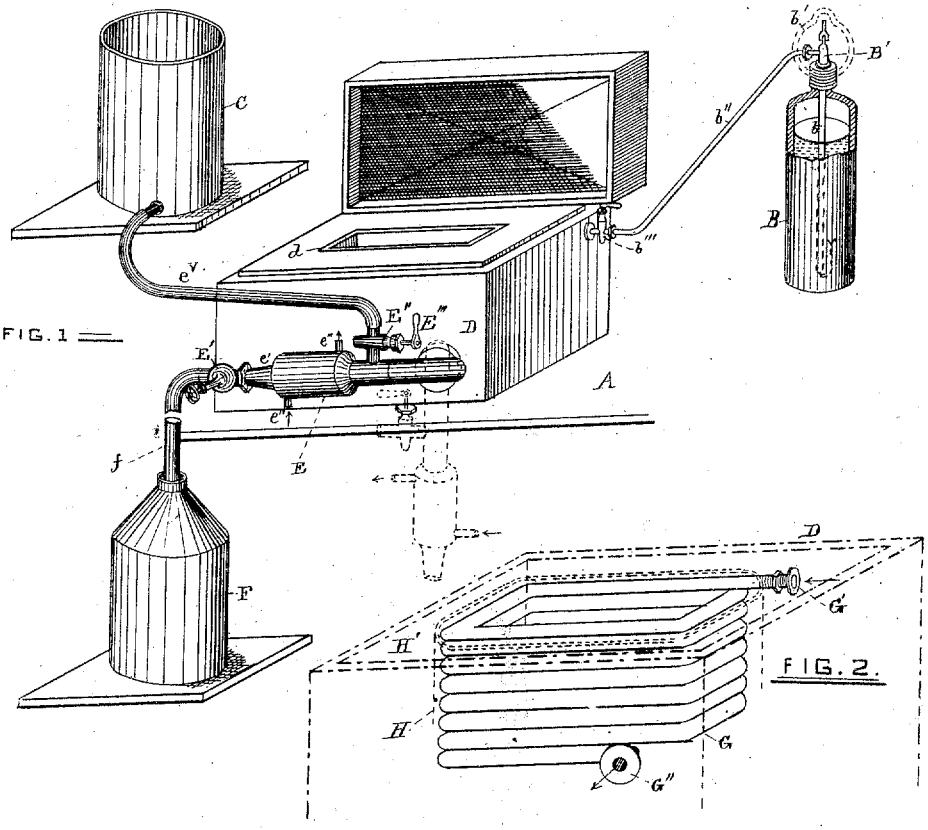
FIG. 1
FIG. 2.
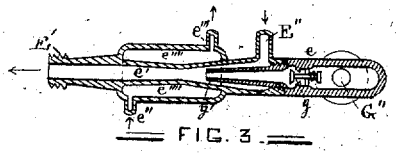
FIG. 3.
WITNESSES.
Peter J. Finney
J. C. Hubbell
INVENTOR.
F. V. De Coppet
By H. N. Jenkins
ATTORNEY.

UNITED STATES PATENT OFFICE

FRANCIS V. DE COPPET, OF NEW ORLEANS, LOUISIANA.

IMPROVEMENT IN PROCESSES AND APPARATUS FOR MAKING ICE.

Specification forming part of Letters Patent No. 156,056, dated October 20, 1874; Reissue No. 8,919, dated September 30, 1879; application filed May 31, 1879.

*To all whom it may concern:*

Be it known that I, FRANCIS V. DE COPPET, of New Orleans, in the parish of Orleans and State of Louisiana, have invented a new and useful Improvement in a Process of and an Apparatus for Making Ice, of which the following is a full, clear, and exact description, reference being had to the annexed drawings, in which—

Figure 1 represents a perspective view of my apparatus, and Figs. 2 and 3 are detached views of the congealer proper and the condenser thereof.

My invention consists in a process of mixing the gas and water in due proportions while in transit, and exposing that part of the apparatus in which the mixture takes place to the action of a cooling agent.

It also consists of an inner and outer receptacle, inclosing, respectively, a pan or vessel and a congealer, with which communicates a pipe supplied with one or more stop-cocks, and leading from a bottle or reservoir having a dipping tube armed with a valve; and of a condenser, wherein the gas is absorbed by passing through a spray of water, the said water being conveyed thereto from a tank or reservoir through a pipe which is furnished with a suitable cock and valve for regulating or checking the supply. A second pipe conveys the aqua-ammonia to a receiving-tank, wherein it is stored for further use.

In the drawings, A represents a table or platform. B is a strong iron bottle, filled with ammonia, and having a dipping tube, *b*, up through which the ammonia under pressure passes from the bottle. The ammonia is introduced into the bottle in the form of liquefied ammonia. B′ is a stop-cock, screwed on the bottle, in which is fitted the dipping tube above mentioned, and by which the bottle is opened and closed. To protect the said cock during transportation, a cap—such as indicated in dotted lines at *b′*—is fitted over the same and to the neck of the bottle.

A branch tube or nozzle extends from the external or upper end of the dipping tube *b* and communicates with a tube or pipe, *b″*, leading to a short tube or nozzle that is screwed to the upper extremity or commencement of the coil of pipe or congealer G, and supplied with a stop-cock, *b‴*. The aforesaid pipe-coil or congealer G is provided with couplings G′ G″ at its induction and eduction extremities, and inclosed by a box or case, H, which is inclosed in a second box or case, D, the space H′ between the boxes being filled with some non-conductor of cold—as, for instance, charcoal.

The congealer or coil of pipe G surrounds a pan or receptacle, *d*, which holds the liquid to be cooled or congealed. The condenser and mixing-chamber E is joined to the congealer at G″, in a manner which will admit of its being adjusted from a horizontal to a vertical position, as shown in Fig. 1. This condenser and mixing-chamber is composed of two parts, *e e′*, the former having its tapering part *g′* extending into and surrounded by the latter, which is screwed to the former part, and which is composed internally of two truncated cones, united together at their smaller ends, as represented in Fig. 3. The larger end of one of the said cones is supplied with a screw-thread, to permit the adjustment thereto of a pipe supplied with a globe-valve, E′, which pipe has a tube, *f*, leading to and entering a can, F. Within the part *e* of the condenser and mixer is a spring check-valve, *g*, to prevent air or water entering the congealer, and at the same time to allow the gas or ammonia to pass from the congealer through the condenser and mixer when the stop-cock *b‴* is open. Surrounding the part *e′* is a jacket, *e′″″ e″″*, to receive cold water for cooling the solution during absorption in the condenser and mixer, and having the induction and eduction tubes *e″* and *e‴*.

The ammonia-gas entering the condenser and mixer is absorbed by water, which is conveyed through a flexible tube or pipe, $e^{v}$, from a reservoir, C, to the tube or nozzle E″, the latter provided with a stop-cock, E‴, for regulating the supply thereof. The tank C may be graduated, so as to ascertain the exact quantity required for the absorption of the gas fed from the bottle B through the congealer G to the condenser and mixer E, by which the gas may acquire a certain specific gravity in becoming aqua ammonia, after which the latter is conducted to and received by the can F. To cut off ingress of air to the condenser and mixer is the object of the globe-valve E′, disposed at the discharge end of the said condenser.

The following directions are to be observed in using my apparatus: A quantity of pure water is put in the tank C, according to the indicated scale or the quantity required for the absorption of the contents of the bottle B, and the water to be congealed is poured into the receptacle or pan *d*, the lid or cover of the box D then being closed. Next, let the cooling-water enter the jacket of the condenser and mixer. Then open wide the stop-cock B′, about half-way the cock *b‴*, (if for making ice, or about one-eighth, if for cooling a liquid;) open wide the valve E′, also the supply-cock E‴. These steps having been taken, the liquefied gas in the bottle, being under pressure, will force itself up through the dipping tube *b* into the pipe *b″*, and expand into the congealer G, where it will absorb heat, freeze the water in the receptacle or pan *d*, and pass from the congealer into the condenser and mixer E, past or by the valve *g*, and through the tapering portion or the spout *g′*, when it will meet the water, be instantly absorbed, and produce a vacuum, at which time it will become cool, by reason of the water in the jacket *e⁗*, and be driven into the receiving-can F, where it is saved as aqua ammonia.

I am aware that ammoniacal gas liquefied by means of mechanical compression has been used for generating artificial cold.

Having thus described my invention, what I claim, and desire to secure by Letters Patent, is—

1. In the manufacture of ice, the process of charging water with ammonia, which consists in mingling the water and ammonia in due proportions while in transit, and exposing them at the point of mixture to the action of a cooling agent, substantially as described.

2. The combination, with an apparatus for making ice, of the condenser or mixer herein described, consisting of the part *e*, provided with a nozzle opening into the double conical channel in the part *e′*, which latter is surrounded by a cooling-chamber, substantially as set forth.

3. The combination, in an ice-machine, of the receptacles D H and vessel or pan *d*, congealer or coil of pipe G, cock *b″′*, tube or pipe *b″*, cock B′, dipping tube *b*, and bottle or reservoir B, all combined, substantially as and for the purpose set forth.

4. The combination, in an ice-machine, of the condenser and mixing-chamber E, the congealer G, pipe *e*, tank C, cock E‴, valve E′, pipe *f*, and can F, substantially as and for the purpose set forth.

5. The combination, with an apparatus for making ice, of the condenser and mixing-chamber E *e e′*, having the part *e′*, and supplied with the spring check-valve *g*, and having the part *e′* formed of two frustums of a cone, and surrounded by the water-jacket *e⁗*, substantially as and for the purpose set forth.

In testimony whereof I have hereunto signed my name.

F. VT. DE COPPET.

In presence of—
PETER I. FINNEY,
J. C. HUBBEL.